(12) United States Patent
Bleidorn

(10) Patent No.: US 12,395,442 B2
(45) Date of Patent: Aug. 19, 2025

(54) SETTING QUALITY OF SERVICE (QOS) FOR A NETWORK BASED ON USER DETECTION

(71) Applicant: Charter Communications Operating, LLC, St. Louis, MO (US)

(72) Inventor: Timothy Clark Bleidorn, Colorado Springs, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 18/497,374

(22) Filed: Oct. 30, 2023

(65) Prior Publication Data

US 2025/0141808 A1   May 1, 2025

(51) Int. Cl.
   *H04L 47/2425* (2022.01)
   *G01J 5/00* (2022.01)
   *G01S 13/04* (2006.01)

(52) U.S. Cl.
   CPC ........ *H04L 47/2433* (2013.01); *G01J 5/0025* (2013.01); *G01S 13/04* (2013.01)

(58) Field of Classification Search
   CPC ..... H04L 47/2433; G01J 5/0025; G01S 13/04
   See application file for complete search history.

(56) References Cited

U.S. PATENT DOCUMENTS

| | | | |
|---|---|---|---|
| 6,930,984 B1* | 8/2005 | Nomura | H04L 41/00 370/254 |
| 11,288,497 B2* | 3/2022 | Uhlemann | H04L 47/10 |
| 2009/0180430 A1* | 7/2009 | Fadell | H04L 47/808 370/329 |
| 2011/0167478 A1* | 7/2011 | Krishnaswamy | H04L 47/824 370/235 |
| 2019/0373503 A1* | 12/2019 | Maria | H04W 28/0268 |
| 2020/0068642 A1* | 2/2020 | Ganu | H04W 4/02 |
| 2020/0194004 A1* | 6/2020 | Bates | G06F 3/167 |
| 2021/0367892 A1* | 11/2021 | Young | H04L 47/627 |
| 2022/0150183 A1* | 5/2022 | Clancy | H04L 47/2441 |
| 2023/0070589 A1* | 3/2023 | Elshafie | H04B 17/318 |

* cited by examiner

*Primary Examiner* — Tonia L Dollinger
*Assistant Examiner* — Linh T. Nguyen
(74) *Attorney, Agent, or Firm* — Dority & Manning, P.A.

(57) ABSTRACT

A broadband network gateway (BNG) implementing a plurality of virtual gateway routers, each virtual gateway router (VGR) operable to serve as a gateway router for a particular local area network (LAN) of a plurality of LANS, receives a human presence indicator from a customer premise equipment (CPE) of a LAN, the human presence indicator indicating one of that a human has been detected by the CPE or that no human has been detected by the CPE for a predetermined period of time. In response, the BNG performs a quality of service (QOS) action, on a VGR that serves as the gateway router for the LAN, that one of enhances a current QOS associated with the first LAN or decreases a current QOS associated with the first LAN.

19 Claims, 7 Drawing Sheets

SETTING QUALITY OF SERVICE (QOS) FOR A NETWORK BASED ON USER DETECTION

BACKGROUND

Devices connected to a local area network (LAN) typically communicate with other devices connected to the same LAN via layer 2 communication protocols, and with devices connected to another LAN via layer 3 protocols. Layer 3 protocol communications are facilitated via a gateway router that is typically physically connected to the same LAN as the sending device and also connected to another network. It can be desirable for a service provider to move functionality conventionally provided by the gateway router in a subscriber's home to the service provider's network for a variety of reasons, including, for example, to reduce a need to send a technician to a customer premises to diagnose and correct issues, facilitate faster problem resolution, and simplify introducing new features.

SUMMARY

The examples disclosed herein set quality of service (QOS) for a network based on user detection by customer premises equipment (CPE).

In one implementation, a method is provided. The method includes receiving, by a broadband network gateway (BNG) implementing a plurality of virtual gateway routers, each virtual gateway router (VGR) operable to serve as a gateway router for a particular local area network (LAN) of a plurality of LANs, a first human presence indicator from a first customer premises equipment (CPE) of a first LAN of the plurality of LANs, the first human presence indicator indicating one of that a human has been detected by the first CPE of the first LAN or that no human has been detected by the first CPE of the first LAN for a predetermined period of time. The method further includes, in response to receiving the first human presence indicator, performing, by the BNG on a first VGR of the plurality of VGRs that serves as the gateway router for the first LAN, a quality of service (QOS) action that one of enhances a current QOS associated with the first LAN or decreases a current QOS associated with the first LAN.

In another implementation, a computing system is provided. The computing system includes one or more computing devices operable to receive a first human presence indicator from a first customer premises equipment (CPE) of a first local area network (LAN) of a plurality of LANs, the first human presence indicator indicating one of that a human has been detected by the first CPE of the first LAN or that no human has been detected by the first CPE of the first LAN for a predetermined period of time. The one or more computing devices are further operable to subsequently perform a quality of service (QOS) action that one of enhances a current QOS associated with the first LAN or decreases a current QOS associated with the first LAN.

In another implementation, a non-transitory computer-readable storage medium is provided. The non-transitory computer-readable storage medium includes executable instructions configured to cause one or more processor devices to receive a first human presence indicator from a first customer premises equipment (CPE) of a first local area network (LAN) of a plurality of LANs, the first human presence indicator indicating one of that a human has been detected by the first CPE of the first LAN or that no human has been detected by the first CPE of the first LAN for a predetermined period of time. The executable instructions are further configured to cause one or more processor devices to subsequently perform a quality of service (QOS) action that one of enhances a current QOS associated with the first LAN or decreases a current QOS associated with the first LAN.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
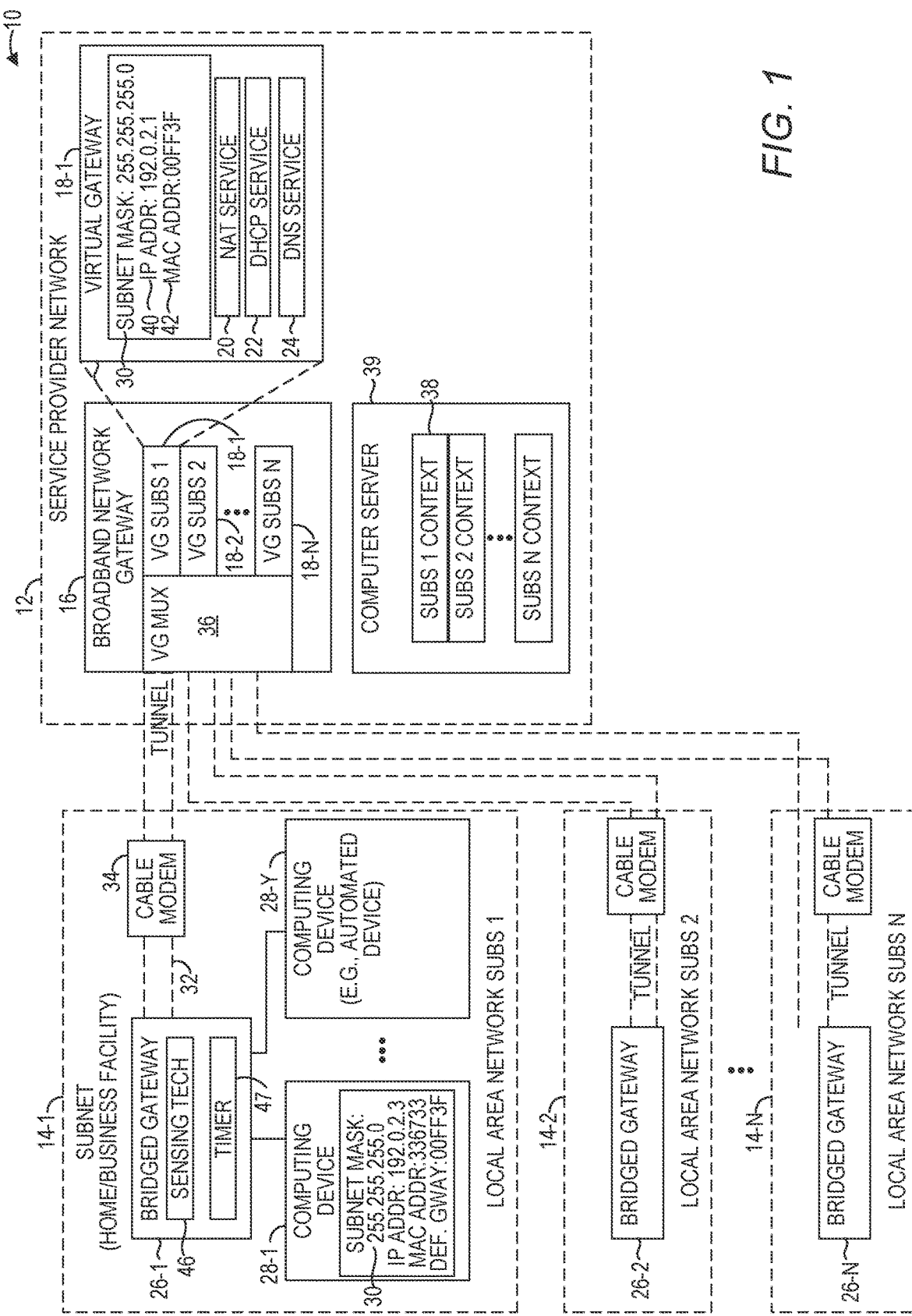
FIG. 1 is a block diagram suitable for setting QOS for a network according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Devices connected to a local area network (LAN) typically communicate with other devices connected to the same LAN via layer 2 communication protocols, and with devices connected to another LAN via layer 3 communication protocols. Layer 3 protocol communications are facilitated via a gateway router that is typically physically connected to the same LAN and also connected to another network, such as a network of a service provider that provides broadband access to the entity operating the LAN. The gateway router implements traditional gateway router services, such as dynamic host configuration protocol (DHCP) services for providing network-connected computing devices with internet protocol (IP) addresses as needed, network address translation (NAT) services to translate private IP addresses associated with a subnetwork to a public IP address, Domain Name System (DNS) services for translating a domain name to an IP address, and the like.

A service provider may desire to provide gateway router functionality from a location within the service provider's network rather than from the customer premises. Moving the gateway functionality from the subscriber's physical location to a network gateway router at a service provider's location, sometimes referred to as a "virtual gateway" or a "virtual gateway router" (VGR), may make it easier to support customer issues and reduce the need to send a technician to a customer premises such as a home or business. It should be understood that, as used herein, the term "customer(s)" or "subscriber(s)" or "user(s)" may be used interchangeably.

The terms subnetwork, or subnet, will be treated synonymously herein, and refer to a data communications network, often but not necessarily an Ethernet network, wherein each connected computing device on the subnet has an IP address that has the same network address, and which utilizes the same subnet mask to determine whether other computing devices are on the same network or are on a different network. Such computing devices may be referred to herein as being "on" or "connected to" or "coupled to" the same subnet. Computing devices on the same subnet can communicate with one another, typically via layer 2 addressing, such as a media access control (MAC) address, without the need for a router. A LAN is an example of a subnet.

Since a virtual gateway is not physically directly connected to the LAN in the same manner as a conventional gateway router, to implement a virtual gateway in a manner that is transparent to devices connected to the LAN, a device on the LAN, such as a bridged gateway, may establish a logical subscriber link (LSL) between the bridged gateway and the virtual gateway. The LSL is typically implemented as a layer 2 (over layer 3) tunnel between the bridged gateway and the virtual gateway, such as, by way of non-limiting example, a GRE tunnel. The bridged gateway may send layer 2 frames generated by devices on the LAN to the virtual gateway via the tunnel, and may receive layer 2 frames generated by the virtual gateway via the tunnel and send the layer 2 frames to a device or devices on the LAN. This is done transparently such that devices on the LAN are unaware that the virtual gateway is not actually directly connected to the same physical network as the devices on the LAN.

A virtual gateway is generated for each customer LAN and multiple virtual gateways may be implemented on a single computing device, sometimes referred to as a broadband network gateway (BNG).

Additionally, service providers typically operate on an "oversubscription" model, meaning the total amount of bandwidth sold to customers may exceed the total amount of bandwidth the service provider is able to deliver, because customers often do not use all of their respective bandwidth, especially at the same time. Put differently, the total bandwidth a service provider can actually support is often a fraction of the total potential bandwidth demand if all customers were to attempt to concurrently access the service provider's network.

Furthermore, with the rise of "always-on" (e.g., automated) devices, such as devices that form part of the Internet of Things (IoT), customers' homes now have a variety of devices that consistently access the network during normal functioning. However, these devices (e.g., thermostats, doorbell cameras, printers, etc.) do not use or require significant amounts of bandwidth to function properly. Moreover, network characteristics, such as latency and jitter, may not negatively impact such devices. In contrast, such network characteristics may degrade a user's network experience when interacting with a computing device. Hence, QOS-related network measurements, which are indicative of a quality of the user's experience with the network, may be more important when a user is interacting with the network than when an "always-on" device, such as an IoT device, is interacting with the network.

Due to the oversubscription issues discussed above, unique opportunities exist for applying network controls and taking quality of service (QOS) actions to prioritize traffic coming from a computing device when a human is using the computing device versus a computing device that is not being operated by a human. In particular, if a human is not present in a customer premises, it may be beneficial to reduce resources allocated to a virtual gateway servicing the LAN in the customer premises so that such resources may be allocated to a virtual gateway servicing a LAN connected to a computing device that is being actively used by a human.

The embodiments disclosed herein implement automatic QOS actions based on user detection by customer premise equipment (CPE). More particularly, a BNG receives a human presence indicator from a particular CPE of a particular LAN that indicates whether the particular CPE detects a human. In response to receiving the human presence indicator from the particular CPE, the BNG performs a QOS action that either enhances a current QOS associated with the particular LAN or decreases a current QOS associated with the particular LAN. In this manner, the BNG is able to differentiate between a LAN that hosts a computing device that may be actively being used by a human, and a LAN that hosts computing devices that are not actively being used by a human. Thus, the BNG can dynamically respond to varying network demand while, at the same time, also maximize the QOS for customers that are interacting with the network.

FIG. 1 is a block diagram of an environment 10 suitable for setting QOS for a network according to one implementation of the present disclosure. The environment 10 includes a service provider network 12 and a plurality of local area networks (LANs) 14-1-14-N (generally, LANs 14), located in subscribers' premises, such as businesses or homes. The service provider network 12 includes a broadband network gateway (BNG) 16 that is a remote (e.g., on another network) computing device that is configured to initiate a plurality of virtual gateways 18-1-18-N (generally, virtual gateways 18) that provide, for the LANs 14-1-14-N, default gateway router functions, such as, by way of non-limiting example, a NAT service 20, a DHCP service 22, a DNS service 24, and a router function to facilitate communication between a computing device connected to a corresponding LAN 14 and a computing device connected to another network. It should be understood that "virtual gateway(s) (VG(s))" and "virtual gateway router(s) (VGR(s))" may be used interchangeably. The BNG 16 is physically located in a facility controlled by the respective service provider, and may be located tens, hundreds, or thousands of miles from the LANs 14. In some embodiments, the virtual gateways 18 may comprise a virtual gateway as described in TR-317 Network Enhanced Residential Gateway, available at www.broadband-forum.org/download/TR-317.pdf.

The LANs 14-1-14-N each include customer premises equipment (CPE) (e.g., "bridged gateways" 26-1-26-N, respectively). The bridged gateway 26-1 is coupled to the LAN 14-1 via a layer 2 transceiver, such as an Ethernet wired transceiver, a Wi-Fi transceiver, or both. The bridged gateway 26-1 is a learning bridge and may serve as a Wi-Fi access point and an Ethernet switch. As will be described in greater detail below, the bridged gateway 26-1 also implements a transparent tunneling mechanism with the BNG 16.

The bridged gateway 26-1 is communicatively coupled to one or more computing devices 28-1-28-Y (generally, computing devices 28) via one or more networking technologies, such as Ethernet, Wi-Fi®, or the like. The bridged gateway 26-1 and the computing device 28-1 are all on the same subnet, and thus each use a same subnet mask 30 to determine whether another computing device is on the LAN 14-1 or on a different network.

During an initialization stage of the bridged gateway 26-1, the bridged gateway 26-1 establishes a layer 2 (via layer 3) tunnel 32 with the BNG 16. The tunneling protocol may comprise any suitable tunneling protocol; however, in some implementations, the tunneling protocol comprises a layer 2 tunneling protocol such as, by way of non-limiting example, the generic routing encapsulation (GRE) tunneling protocol. The bridged gateway 26-1 and the BNG 16 use their respective IP addresses to establish the layer 2 (over layer 3) tunnel. There may be any number of devices between the bridged gateway 26-1 and the BNG 16, such as, by way of non-limiting example, a cable modem 34 and one or more switching devices (not illustrated) in the service provider network 12.

The BNG 16 establishes a virtual gateway 18-1 that will serve as the default gateway router for the LAN 14-1. At connection time or during a power up, the computing device 28-1 may broadcast a DHCP discover message in order to obtain an IP address. The bridged gateway 26-1 sends the DHCP discover message to the BNG 16 via the tunnel 32. A virtual gateway multiplexer 36 determines that the message is destined for the virtual gateway 18-1 and provides the message to the virtual gateway 18-1 for processing. The virtual gateway 18-1 is provided a same subnet mask 30 as the subnet mask 30 provided to the computing devices 28-1 on the LAN 14-1 and may be given an IP address 40 that is on the LAN 14-1. The virtual gateway 18-1 responds to the message using a layer 2 frame and sends the layer 2 frame toward the bridged gateway 26-1. In the case where the message from the computing device 28-1 is a DHCP Discover message, the layer 2 frame may include an IP address for the computing device 28-1, the subnet mask 30, and an indication that the virtual gateway 18-1 is the default gateway router for the LAN 14-1. The virtual gateway 18-1 inserts a MAC address 42 as the MAC address of the virtual gateway 18-1 in the layer 2 frame.

The BNG 16 encapsulates the layer 2 frame into a layer 3 protocol, such as TCP/IP, and sends the layer 2 frame to the bridged gateway 26-1 via the tunnel 32. The bridged gateway 26-1 extracts the layer 2 frame from the layer 3 protocol and sends the layer 2 frame to the computing device 28-1 using the MAC address 42 of the virtual gateway 18-1 as the originator of the layer 2 frame. The computing device 28-1 receives the response to the DHCP request and perceives the virtual gateway 18-1 as being physically on the LAN 14-1 because the tunnelling of packets between the bridged gateway 26-1 and the BNG 16 is transparent to any computing device 28-1 connected to the LAN 14-1.

Subsequently, if the computing device 28-1 desires to send a packet to a computing device that is not on the LAN 14-1, the computing device 28-1 will address the packet to the virtual gateway 18-1 using the MAC address 42. The bridged gateway 26-1 will receive the packet, determine that the packet is addressed to the virtual gateway 18-1, encapsulate the packet in the layer 3 protocol, and send the packet to the BNG 16 via the tunnel 32.

The virtual gateway multiplexer 36 will receive the packet, determine that the packet is destined for the virtual gateway 18-1, and send the packet to the virtual gateway 18-1. The virtual gateway 18-1 forwards the packet to a router based on routing tables maintained by the virtual gateway 18-1 in the same manner as a conventional gateway router.

The bridged gateway 26-1 forwards all layer 2 frames generated by a computing device 28-1 on the LAN 14-1 that have a destination address of the virtual gateway 18-1 and all broadcast layer 2 frames to the virtual gateway 18-1. To the computing device 28-1, the virtual gateway 18-1 appears to be directly coupled to the LAN 14-1.

The bridged gateways 26-2-26-N operate substantially similarly to the bridged gateway 26-1.

In some implementations, the LANs 14, such as the LAN 14-1, may include one or more "always-on" (e.g., automated) computing devices 28-Y (hereinafter sometimes referred to as "automated device(s)"), such as, by way of non-limiting example, IoT-related devices, that relatively consistently utilize the LAN 14-1 to obtain or send data to a computing device on another network. In contrast to other computing devices 28, however, the computing devices 28-Y may not use or require significant amounts of bandwidth to function properly. Moreover, such computing devices 28-Y may be less sensitive to network characteristics (e.g., latency, jitter, packet loss, etc.) that adversely affect the QOS of the network, because a human is not interacting with the LAN 14-1 via the computing devices 28-Y.

When a user is not present in the customer premises, the BNG 16 may perform one or more QOS actions to release network resources used to improve QOS that were previously allocated to the LAN 14-1 (by the BNG 16 via the virtual gateway 18-1), thereby enabling the BNG 16 to redistribute those network resources elsewhere (e.g., to LANs 14-2-14-N). In this manner, the BNG 16 is operable to dynamically allocate network resources based on the user's presence in the customer premises. As will be described in greater detail below, "network resources" refers to a variety of mechanisms in the service provider network 12 that are available to and used by the BNG 16 to improve QOS for each of the LANs 14-1-14-N, respectively.

In some implementations, the bridged gateway 26-1, or another CPE device connected to the LAN 14-1, is operable to detect a presence of a human. In this example, the bridged gateway 26-1 may include sensing technology 46, such as a sensing device that is operable to detect a human in the subscriber's premises. The detection may be via any suitable technology, such as motion detection, heat sensing (e.g., IR sensing), object recognition via camera imagery, or the like.

For instance, by way of non-limiting example, the sensing technology 46 may comprise an infrared (IR) sensing device operable to detect a presence of a human. In another implementation the sensing technology 46 may comprise a radio frequency (RF) sensing device. In such implementations, the sensing technology 46 is operable to detect a human based on RF signals transmitted and/or received by the bridged gateway 26-1. In particular, the bridged gateway 26-1 is operable to emit an initial RF signal and receive a reflected RF signal corresponding to the initial RF signal. The bridged gateway 26-1 (via the sensing technology 46) detects the one or more entities based on a difference between the initial RF signal and the reflected RF signal, such as, by non-limiting example, a change in a signal strength of the reflected RF signal with respect to a signal strength of the initial RF signal, a change in a phase of the reflected RF signal with respect to a phase of the initial RF signal, or a Doppler shift in the reflected RF signal with respect to the initial RF signal.

In another implementation, the sensing technology 46 may comprise a camera and object detection software that is operable to determine if a human is within a field of view of the camera. In some implementations, the customer premises may comprise a plurality of sensing devices located in different rooms of the customer premises. In such implementations, the bridged gateway 26-1 may generate and send a control signal comprising a human presence indicator indicating that no human is present only if every sensing device of the plurality of sensing devices indicates that no human is present.

Furthermore, the bridged gateway 26-1 may maintain a timer 47 and set the timer 47 to a predetermined period of time. The bridged gateway 26-1 may reset the timer 47 each time the sensing technology 46 detects the presence of the human. If the timer 47 expires, the bridged gateway 26-1 communicates a control signal to the BNG 16 that indicates that no human has been detected for the predetermined period of time and, subsequently, again sets the timer 47 to the predetermined period of time.

The bridged gateway 26-1 is further operable to generate and transmit, to the BNG 16, one or more control signals comprising a human presence indicator, which indicates whether a human was detected by the sensing technology 46. When the sensing technology 46 detects a human, the bridged gateway 26-1 generates and transmits, to the BNG 16, a control signal comprising a human presence indicator indicating a human has been detected by the sensing technology 46. Conversely, if the timer 47 expires after the predetermined period of time, the bridged gateway 26-1 generates and transmits, to the BNG 16, a control signal comprising a human presence indicator indicating that no human has been detected by the sensing technology 46. In this way, the BNG 16 may determine the source of network traffic coming from LAN 14-1 based on the human presence indicator generated and transmitted by the bridged gateway 26-1.

It should be noted that the control signal may be any suitable message such as, by non-limiting example, a control plane message that causes a flag to be set in a database (not shown) accessible by the BNG 16 or a control plane message comprising more extensive information (e.g., timers, last recorded motion, etc.). In other implementations, the control signal may be a message communicated directly to the BNG 16 that either originates from the bridged gateway 26-1, or, where the sensing technology 46 is in a computing device 28, originates from such computing device 28.

The BNG 16 is operable to implement a variety of control actions (e.g., QOS actions) based on the human presence indicators generated by the bridged gateways 26-1-26-N. In particular, as described above, the BNG 16 may receive a human presence indicator from the bridged gateway 26-1. In response to receiving the human presence indicator from the bridged gateway 26-1, the BNG 16 performs a quality of service (QOS) action on the corresponding virtual gateway 18-1 which, as noted above, serves as the gateway router for the LAN 14-1. As will be discussed in greater detail below, the QOS action performed by the BNG 16 may include, by way of non-limiting example, enhancing a current QOS associated with the LAN 14-1 or decreasing the current QOS associated with the LAN 14-1.

In some implementations, the BNG 16 receives a human presence indicator from the bridged gateway 26-1 that indicates an entity, such as a human, is detected by the bridged gateway 26-1 (via the sensing technology 46). In such implementations, the QOS action includes enhancing the current QOS associated with the LAN 14-1.

By way of non-limiting example, the BNG 16 may enhance the current QOS associated with the LAN 14-1 by increasing a flow priority of a packet flow associated with a device connected to the LAN 14-1, such as the computing device 28-1, increasing an amount of memory allocated to the virtual gateway 18-1, providing a lower latency queue than a default latency queue to the computing device 28-1, providing the computing device 28-1 with a custom path through the service provider network 12 that is different from a default path through the service provider network 12, or providing a higher bandwidth to the computing device 28-1 than a provisioned service tier bandwidth of the LAN 14-1.

In other implementations, the BNG 16 receives a human presence indicator from the bridged gateway 26-1 that indicates no entity, such as a human, is detected by the bridged gateway 26-1 (via the sensing technology 46). In such implementations, the QOS action includes decreasing the current QOS associated with the LAN 14-1.

By way of non-limiting example, the BNG 16 may decrease the current QOS associated with the LAN 14-1 by decreasing a flow priority of a packet flow associated with a device connected to the LAN 14-1, such as computing device 28-1, decreasing an amount of memory allocated to the virtual gateway 18-1, providing a higher latency queue than a default latency queue to the computing device 28-1, or decreasing the bandwidth to the computing device 28-1 below a provisioned service tier bandwidth of the LAN 14-1.

Figure 2:
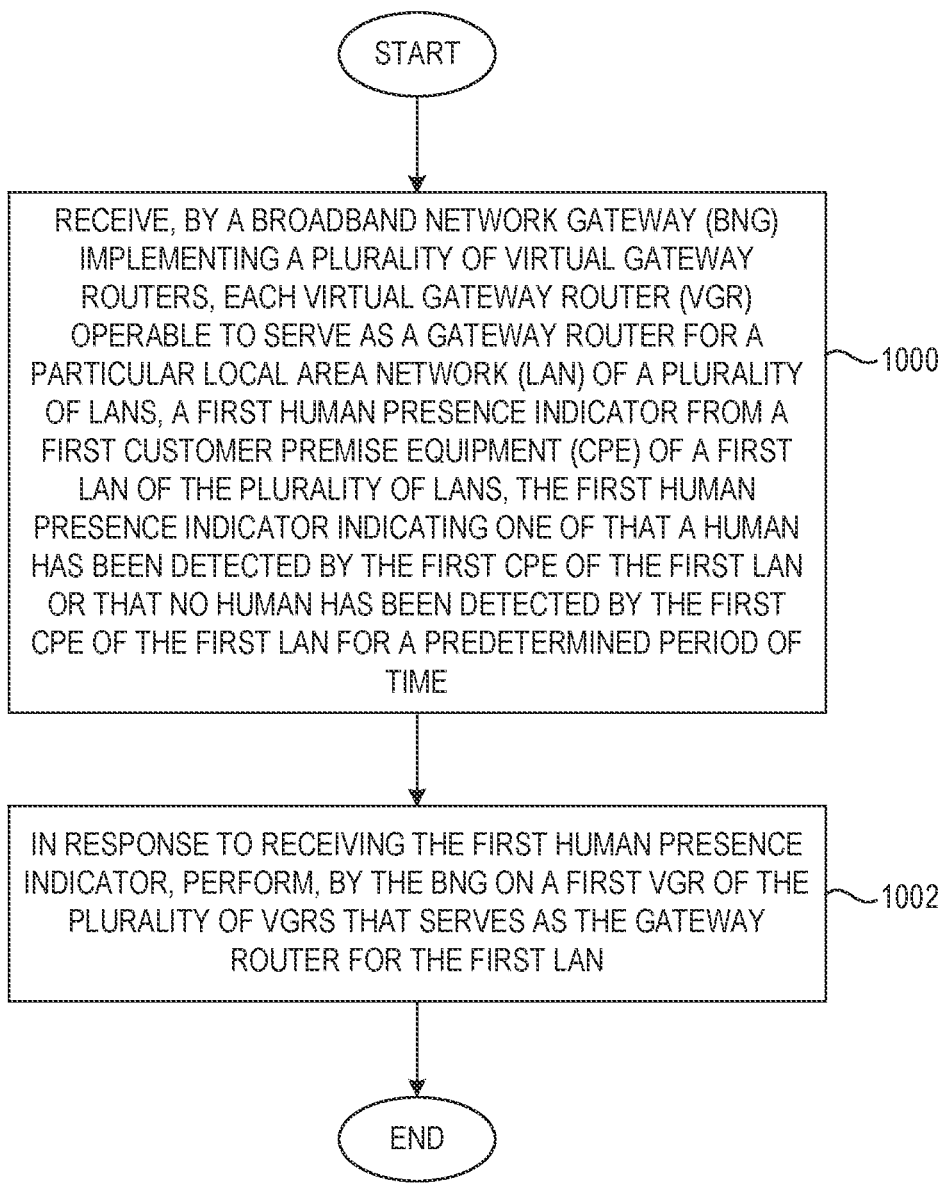
FIG. 2 is a flowchart of a method for setting QOS for a first network according to one implementation.

FIG. 2 is a flowchart of a method for setting QOS for a first network according to one implementation of the present disclosure. FIG. 2 will be discussed in conjunction with FIG. 1. The BNG 16, which implements the plurality of virtual gateways 18-1-18-N serving as the gateway routers for the LANs 14-1-14-N (respectively), receives a human presence indicator from a first bridged gateway, such as bridged gateway 26-1, the human presence indicator indicating whether a human has been detected by the bridged gateway 26-1 (FIG. 2, block 1000). In response to receiving the human presence indicator from the bridged gateway 26-1, the BNG 16 performs a quality of service (QOS) action on the virtual gateway serving as the gateway router for LAN 14-1, such as virtual gateway 18-1 (FIG. 2, block 1002). As discussed herein, the QOS action may enhance a current QOS associated with the LAN 14-1 or decrease a current QOS associated with the LAN 14-1.

Figure 3:
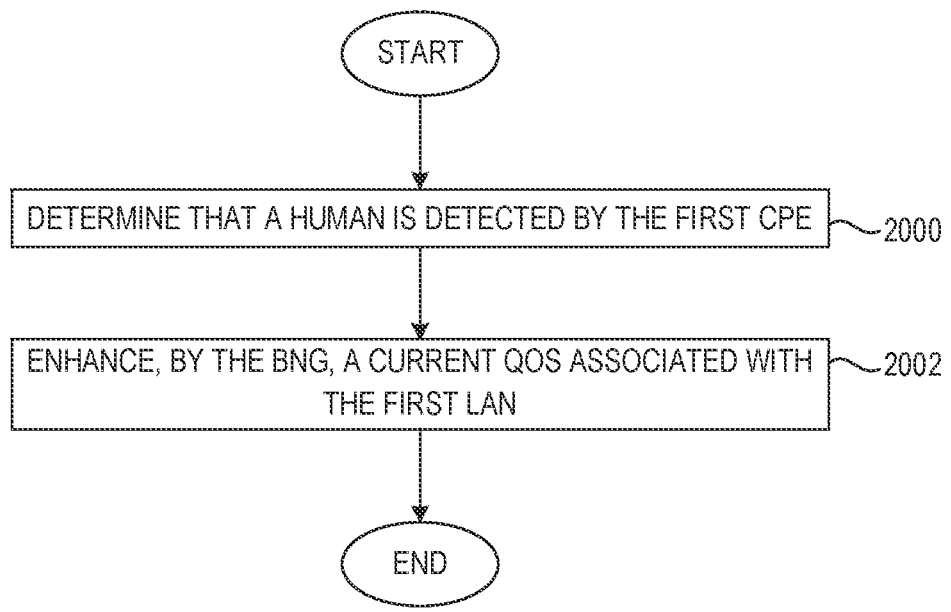
FIG. 3 is a flowchart of a method for performing QOS actions according to one implementation.

FIG. 3 is a flowchart of a method for performing QOS actions according to one implementation of the present disclosure. FIG. 3 will be discussed in conjunction with FIG. 1. The BNG 16 determines that a human is detected by the bridged gateway 26-1 when the human presence indicator, received from the bridged gateway 26-1, indicates that the sensing technology 46 detected a human (FIG. 3, block 2000). Subsequently, the BNG 16 enhances the current QOS associated with the LAN 14-1 by, for example, increasing a flow priority of a packet flow associated with one or more devices connected to the LAN 14-1, such as computing device 28-1, or increasing an amount of memory allocated to the virtual gateway serving as the gateway router for the LAN 14-1, such as virtual gateway 18-1 (FIG. 3, block 2002).

Figure 4:
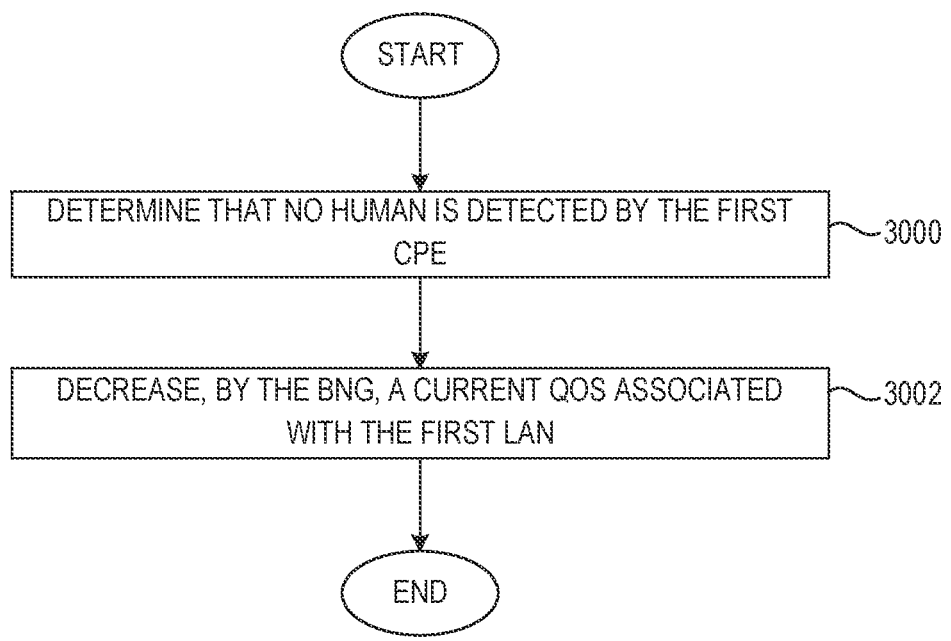
FIG. 4 is a flowchart of a method for performing QOS actions according to one implementation.

FIG. 4 is a flowchart of a method for performing QOS actions according to one implementation of the present disclosure. FIG. 4 will be discussed in conjunction with FIG. 1. The BNG 16 determines that no human is detected by the bridged gateway 26-1 when the human presence indicator, received from the bridged gateway 26-1, indicates that the sensing technology 46 has not detected the human in the customer premises for a predetermined time period (FIG. 4, block 3000). Subsequently, the BNG 16 decreases the current QOS associated with the LAN 14-1 by, for example, decreasing a flow priority of a packet flow associated with one or more devices connected to the LAN 14-1, such as the computing device 28-1, or decreasing an amount of memory allocated to the virtual gateway serving as the gateway router for the LAN 14-1, such as virtual gateway 18-1 (FIG. 4, block 3002).

Figure 5:
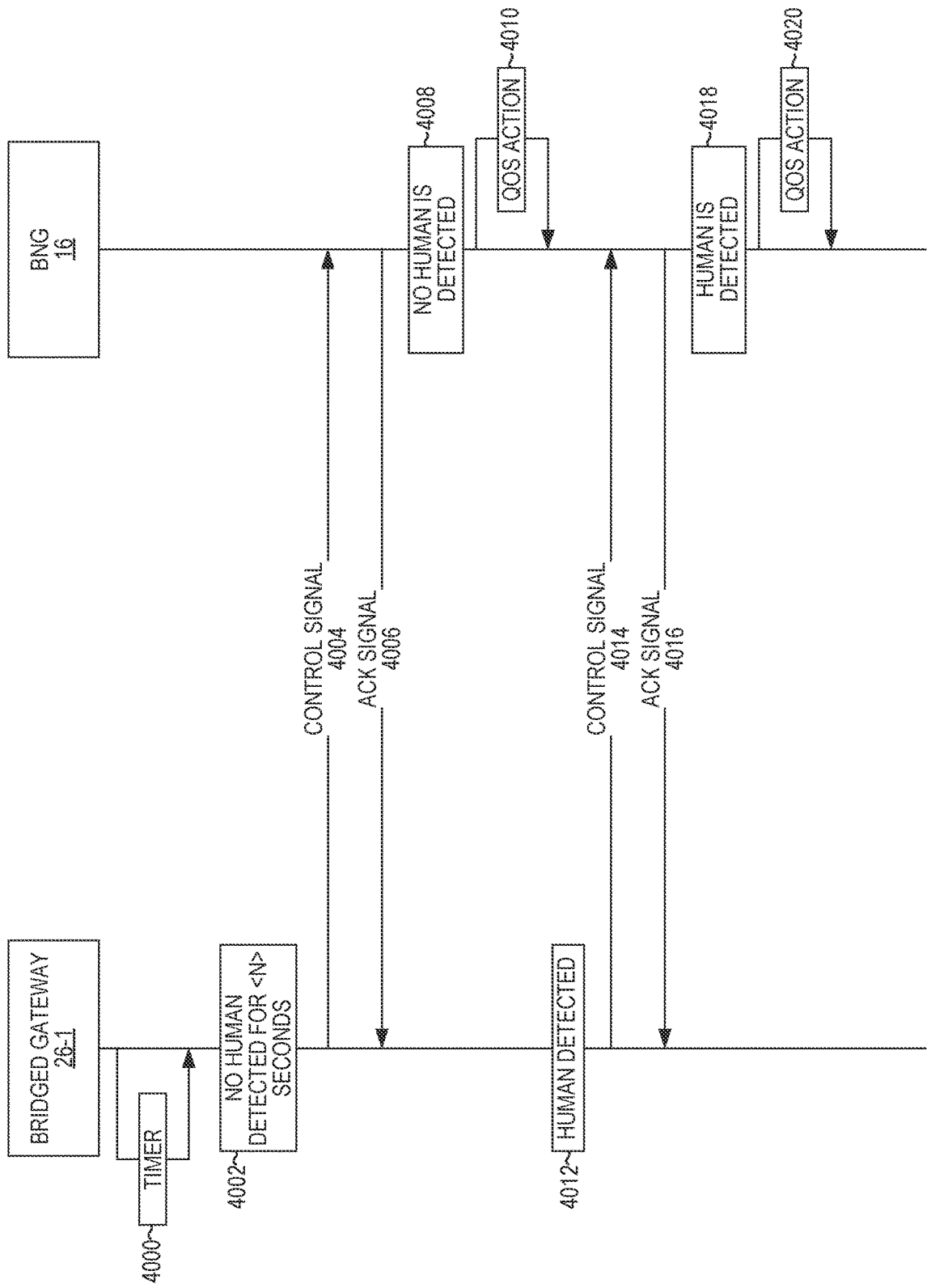
FIG. 5 is a sequence diagram illustrating messages communicated between and actions taken by certain components illustrated in FIG. 1 to implement setting QOS for a network according to one implementation.

FIG. 5 is a sequence diagram illustrating messages communicated between and actions taken by certain components illustrated in FIG. 1 to implement setting QOS for a network according to one implementation of the present disclosure. The bridged gateway 26-1 initiates the sensing technology 46 and, concurrently, sets the timer 47 (FIG. 5, step 4000). The sensing technology 46 does not detect a human in the customer premises, and, after a predetermined period of time, the timer 47 expires (FIG. 5, step 4002). Subsequent to the expiration of the timer 47, the bridged gateway 26-1 determines that no human is detected and, in response, sends a control signal comprising a human presence indicator to the BNG 16 (FIG. 5, step 4004). The BNG 16 receives the control signal from the bridged gateway 26-1 and, to confirm receipt, sends an acknowledgement (ACK) signal back to the bridged gateway 26-1 (FIG. 5, step 4006).

The BNG 16 processes the control signal received from the bridged gateway 26-1 and, based on the human presence indicator included in the control signal, determines that no human has been detected by the bridged gateway 26-1 (FIG. 5, step 4008). In response to determining that the bridged gateway 26-1 has not detected a human, the BNG 16 performs one or more QOS actions to decrease a current QOS associated with the LAN 14-1, such as, by way on non-limiting example, decreasing a flow priority of a packet flow associated with a device connected to the LAN 14-1, such as computing device 28-1, or decreasing an amount of memory allocated to the virtual gateway serving as the gateway router for the LAN 14-1, such as virtual gateway 18-1 (FIG. 5, step 4010).

At some point in time, the sensing technology 46 detects a human (FIG. 5, step 4012). Subsequent to the sensing technology 46 detecting the human, the bridged gateway 26-1 determines that a human is detected and, in response, sends a control signal comprising a human presence indicator to the BNG 16 (FIG. 5, step 4014). The BNG 16 receives the control signal from the bridged gateway 26-1 and, to confirm receipt, sends an acknowledgement (ACK) signal back to the bridged gateway 26-1 (FIG. 5, step 4016).

The BNG 16 processes the control signal received from the bridged gateway 26-1 and, based on the human presence indicator included in the control signal, determines that a human has been detected by the bridged gateway 26-1 (FIG. 5, step 4018). In response to determining that the bridged gateway 26-1 has detected a human, the BNG 16 performs one or more QOS actions to enhance a current QOS associated with the LAN 14-1, such as, by way on non-limiting example, increasing a flow priority of a packet flow associated with a device connected to the LAN 14-1, such as computing device 28-1, or increasing an amount of memory allocated to the virtual gateway serving as the gateway router for the LAN 14-1, such as virtual gateway 18-1 (FIG. 5, step 4020).

Figure 6:
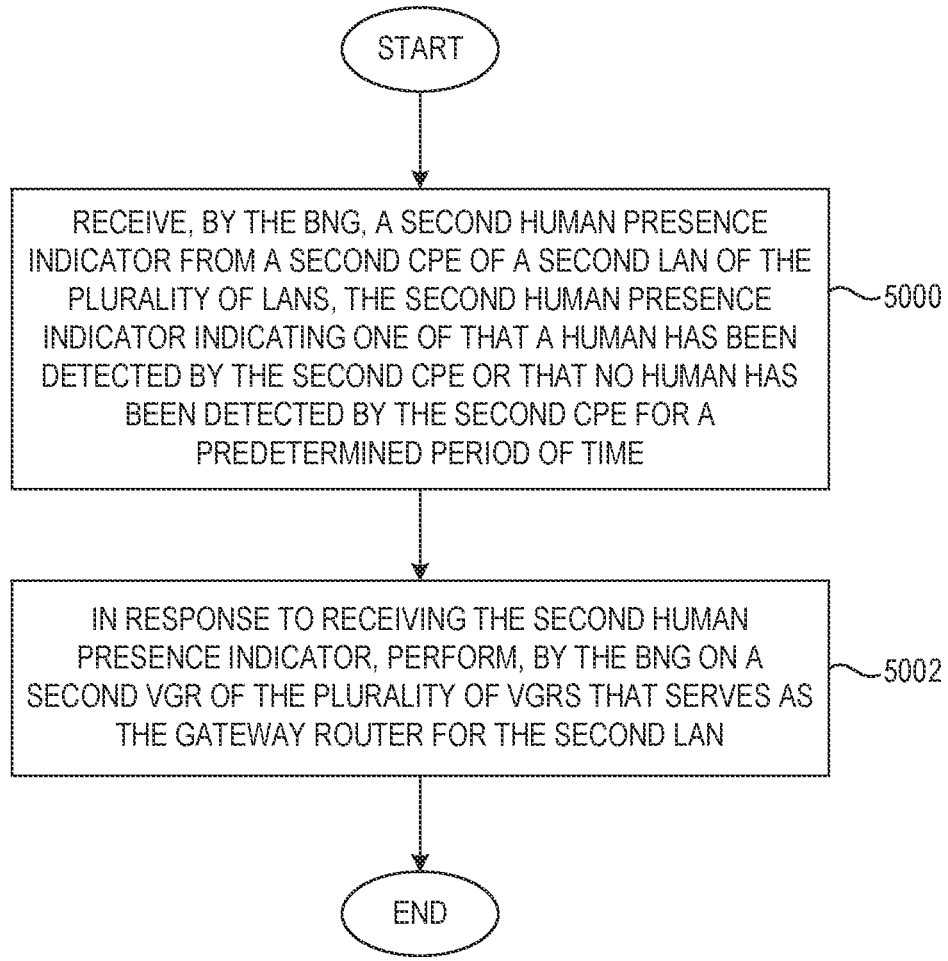
FIG. 6 is a flowchart of a method for setting QOS for a second network according to one implementation.

FIG. 6 is a flowchart of a method for setting QOS for a second network according to one implementation of the present disclosure. FIG. 6 will be discussed in conjunction with FIG. 1. The BNG 16 receives a human presence indicator from a second bridged gateway, such as the bridged gateway 26-2, the human presence indicator indicating whether a human has been detected by the bridged gateway 26-2 (FIG. 6, block 5000). In response to receiving the human presence indicator from the bridged gateway 26-2, the BNG 16 performs a quality of service (QOS) action on the virtual gateway serving as the gateway router for LAN 14-2, such as virtual gateway 18-2 (FIG. 6, block 5002). As discussed herein, the QOS action may enhance a current QOS associated with the LAN 14-2 or decrease a current QOS associated with the LAN 14-2.

Figure 7:
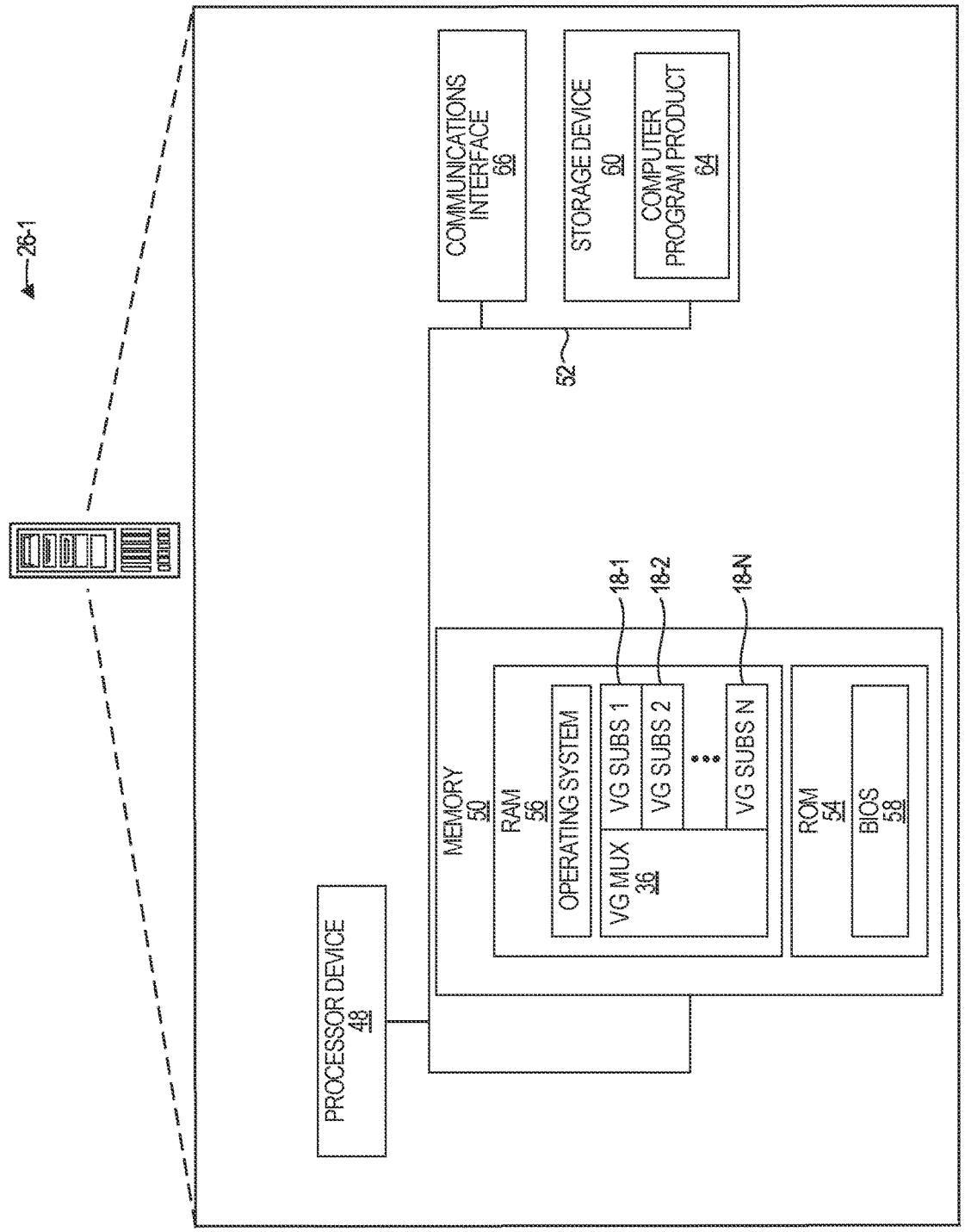
FIG. 7 is a block diagram of a broadband network gateway (BNG) suitable for implementing examples disclosed herein.

FIG. 7 is a block diagram of the BNG 16 suitable for implementing examples disclosed herein. The BNG 16 is configured to initiate the plurality of virtual gateways 18-1-18-N, which provide default gateway router functions for the LANs 14-1-14-N. The BNG 16 includes a processor device 48, a system memory 50, and a system bus 52. The system bus 52 provides an interface for system components including, but not limited to, the system memory 50, the plurality of virtual gateways 18-1-18-N, and the processor device 48. The processor device 48 can be any commercially available or proprietary processor.

The system bus 52 may be any of several types of bus structures that may further interconnect to a memory bus (with or without a memory controller), a peripheral bus, and/or a local bus using any of a variety of commercially available bus architectures. The system memory 50 may include non-volatile memory 54 (e.g., read-only memory (ROM), erasable programmable read-only memory (EPROM), electrically erasable programmable read-only memory (EEPROM), etc.), and volatile memory 56 (e.g., random-access memory (RAM)). A basic input/output system (BIOS) 58 may be stored in the non-volatile memory 54 and can include the basic routines that help to transfer information between elements within the BNG 16. The volatile memory 56 may also include a high-speed RAM, such as static RAM, for caching data.

The BNG 16 may further include or be coupled to a non-transitory computer-readable storage medium such as a storage device 60, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 60 and other drives associated with computer-readable media and computer-usable media may provide non-volatile storage of data, data structures, computer-executable instructions, and the like.

A number of modules can be stored in the storage device 60 and in the volatile memory 56, including an operating system and one or more program modules, which may implement the functionality described herein in whole or in part. All or a portion of the examples may be implemented as a computer program product 64 stored on a transitory or non-transitory computer-usable or computer-readable storage medium, such as the storage device 60, which includes complex programming instructions, such as complex computer-readable program code, to cause the processor device 48 to carry out the steps described herein. Thus, the computer-readable program code can comprise software instructions for implementing the functionality of the examples described herein when executed on the processor device 48. The processor device 48, in conjunction with the controller 62 in the volatile memory 56, may serve as a controller, or control system, for the BNG 16 that is to implement the functionality described herein.

The BNG 16 may also include a number of communication interfaces, such as a communications interface 66, that are suitable for communicating with a network (or devices connected thereto) as appropriate or desired. For instance, by way of non-limiting example, the BNG 16 may include a WAN interface via which the BNG 16 can communicate with other devices associated with the service provider network 12, such as a cable or fiber modem (or the like), and which facilitates communications with, for example, the bridged gateways 26-1-26-N coupled to the LANs 14-1-14-N (respectively).

Individuals will recognize improvements and modifications to the preferred examples of the disclosure. All such improvements and modifications are considered within the scope of the concepts disclosed herein and the claims that follow.

What is claimed is:

1. A method, comprising:
   receiving, by a broadband network gateway (BNG) implementing a plurality of virtual gateway routers, each virtual gateway router (VGR) operable to serve as a gateway router for a particular local area network (LAN) of a plurality of LANs, a first human presence indicator from a first customer premises equipment (CPE) of a first LAN of the plurality of LANs, the first human presence indicator indicating one of that a human has been detected by the first CPE of the first LAN or that no human has been detected by the first CPE of the first LAN for a predetermined period of time; and
   in response to receiving the first human presence indicator, performing, by the BNG on a first VGR of the plurality of VGRs that serves as the gateway router for the first LAN, a quality of service (QOS) action that one of:
   (a) enhances a current QOS associated with the first LAN; or
   (b) decreases a current QOS associated with the first LAN.

2. The method of claim 1, wherein the first CPE comprises an infrared (IR) sensing device operable to detect a presence of the human.

3. The method of claim 1, wherein the first CPE comprises a radio frequency (RF) sensing device operable to detect a presence of the human based on a reflected RF signal corresponding to an initial RF signal emitted by the first CPE.

4. The method of claim 3, wherein the RF sensing device detects the presence of the human based on a difference between the reflected RF signal and the initial RF signal, the difference being at least one of:
   a change in a signal strength of the reflected RF signal with respect to a signal strength of the initial RF signal;
   a change in a phase of the reflected RF signal with respect to a phase of the initial RF signal; or
   a Doppler shift in the reflected RF signal with respect to the initial RF signal.

5. The method of claim 1, wherein the first human presence indicator indicates that the human is detected by the first CPE, and wherein performing the QOS action comprises enhancing, by the BNG, the current QOS associated with the first LAN.

6. The method of claim 5, wherein enhancing, by the BNG, the current QOS associated with the first LAN comprises at least one of:
   increasing, by the BNG, a flow priority of a packet flow associated with a device connected to the first LAN; or
   increasing, by the BNG, an amount of memory allocated to the first VGR.

7. The method of claim 1, wherein the first human presence indicator indicates that that no human has been detected by the first CPE, and wherein performing the QOS action comprises decreasing, by the BNG, the current QOS associated with the first LAN.

8. The method of claim 7, wherein decreasing the current QOS associated with the first LAN comprises at least one of:
   decreasing, by the BNG, a flow priority of a packet flow associated with a device connected to the first LAN; or
   decreasing, by the BNG, an amount of memory allocated to the first VGR.

9. The method of claim 1, further comprising:
   receiving, by the BNG, a second human presence indicator from a second CPE of a second LAN of the plurality of LANs, the second human presence indicator indicating one of that a human has been detected by the second CPE or that no human has been detected by the second CPE for a predetermined period of time; and
   in response to receiving the second human presence indicator, performing, by the BNG on a second VGR of the plurality of VGRs that serves as the gateway router for the second LAN, a QOS action that one of:
   (a) enhances a current QOS associated with the second LAN; or
   (b) decreases a current QOS associated with the second LAN.

10. A computing system, comprising:
    one or more computing devices comprising a broadband network gateway (BNG) implementing a plurality of virtual gateway routers, each virtual gateway router (VGR) operable to serve as a gateway router for a particular local area network (LAN) of a plurality of LANs, the one or more computing devices operable to:
    receive a first human presence indicator from a first customer premises equipment (CPE) of a first LAN of the plurality of LANs, the first human presence indicator indicating one of that a human has been detected by the first CPE of the first LAN or that no human has been detected by the first CPE of the first LAN for a predetermined period of time; and
    subsequently perform a quality of service (QOS) action that one of:

(a) enhances a current QOS associated with the first LAN; or
(b) decreases a current QOS associated with the first LAN.

11. The computing system of claim 10, wherein the BNG is operable to receive the first human presence indicator from the first CPE and perform the QOS action on a first VGR of the plurality of VGRs in response to receiving the first human presence indicator from the first CPE.

12. The computing system of claim 11, wherein the first human presence indicator indicates that the human is detected by the first CPE, and wherein performing the QOS action comprises enhancing, by the BNG, the current QOS associated with the first LAN by increasing one of:
a flow priority of a packet flow associated with a device connected to the first LAN; or
an amount of memory allocated to the first VGR.

13. The computing system of claim 11, wherein the first human presence indicator indicates that no human has been detected by the first CPE, and wherein performing the QOS action comprises decreasing, by the BNG, the current QOS associated with the first LAN by decreasing one of:
a flow priority of a packet flow associated with a device connected to the first LAN; or
an amount of memory allocated to the first VGR.

14. The computing system of claim 10, wherein the first CPE comprises at least one of:
an infrared (IR) sensing device operable to detect a presence of the human; or
a radio frequency (RF) sensing device operable to detect a presence of the human based on a reflected RF signal corresponding to an initial RF signal emitted by the first CPE, the RF sensing device operable to detect the presence of the human based on at least one of:
a change in signal strength of the reflected RF signal with respect to a signal strength of the initial RF signal;
a change in a phase of the reflected RF signal with respect to a phase of the initial RF signal; or
a Doppler shift in the reflected RF signal with respect to the initial RF signal.

15. The computing system of claim 10, wherein the one or more computing devices are further operable to:
receive a second human presence indicator from a second CPE of a second LAN of the plurality of LANs, the second human presence indicator indicating one or that a human has been detected by the second CPE or that no human has been detected by the second CPE for a predetermined period of time; and
subsequently perform a QOS action that one of:
(a) enhances a current QOS associated with the second LAN; or
(b) decreases a current QOS associated with the second LAN.

16. A non-transitory computer-readable storage medium of a broadband network gateway (BNG) that includes executable instructions, the BNG implementing a plurality of virtual gateway routers, each virtual gateway router (VGR) operable to serve as a gateway router for a particular local area network (LAN) of a plurality of LANs, the executable instructions configured to cause one or more processor devices of the BNG to:
receive a first human presence indicator from a first customer premises equipment (CPE) of a first LAN of the plurality of LANs, the first human presence indicator indicating one of that a human has been detected by the first CPE of the first LAN or that no human has been detected by the first CPE of the first LAN for a predetermined period of time; and
subsequently perform a quality of service (QOS) action that one of:
(a) enhances a current QOS associated with the first LAN; or
(b) decreases a current QOS associated with the first LAN.

17. The non-transitory computer-readable storage medium of claim 16, wherein the first human presence indicator indicates that the human is detected by the first CPE, and wherein performing the QOS action comprises enhancing the current QOS associated with the first LAN by increasing one of:
a flow priority of a packet flow associated with a device connected to the first LAN; or
an amount of memory allocated to a first VGR of the plurality of VGRs implemented by the BNG.

18. The non-transitory computer-readable storage medium of claim 16, wherein the first human presence indicator indicates that no human has been detected by the first CPE, and wherein performing the QOS action comprises decreasing the current QOS associated with the first LAN by decreasing one of:
a flow priority of a packet flow associated with a device connected to the first LAN; or
an amount of memory allocated to a first VGR of the plurality of VGRs implemented by the BNG.

19. The non-transitory computer-readable storage medium of claim 16, wherein the instructions further cause the one or more processor devices to:
receive a second human presence indicator from a second CPE of a second LAN of the plurality of LANs, the second human presence indicator indicating one or that a human has been detected by the second CPE or that no human has been detected by the second CPE for a predetermined period of time; and
subsequently perform a QOS action that one of:
(a) enhances a current QOS associated with the second LAN; or
(b) decreases a current QOS associated with the second LAN.

* * * * *